3,734,755
METHOD OF PRODUCING REFRACTORY MATERIAL
Ernest Andres Lado, Hastings-on-Hudson, N.Y., assignor to Nichols Engineering & Research Corp., New York, N.Y.
Filed May 20, 1971, Ser. No. 145,218
Int. Cl. F27b 1/00
U.S. Cl. 106—73.4
9 Claims

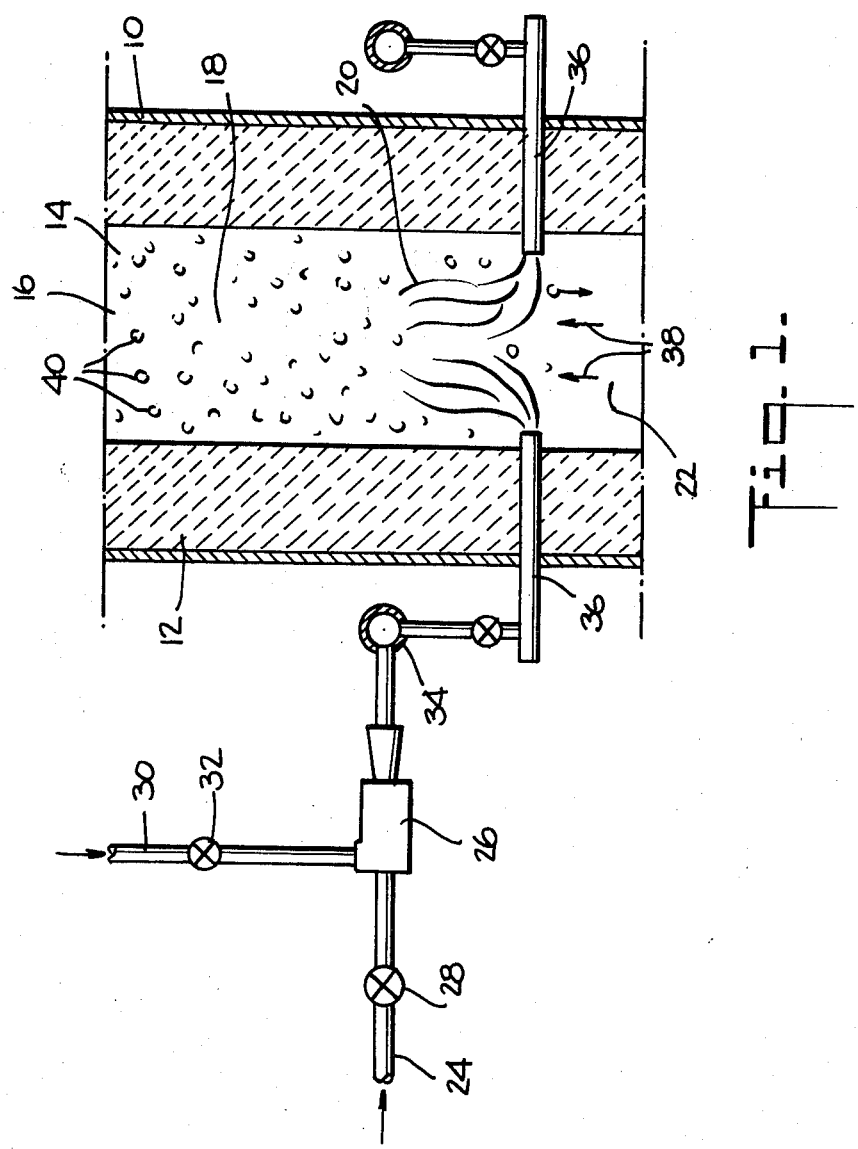

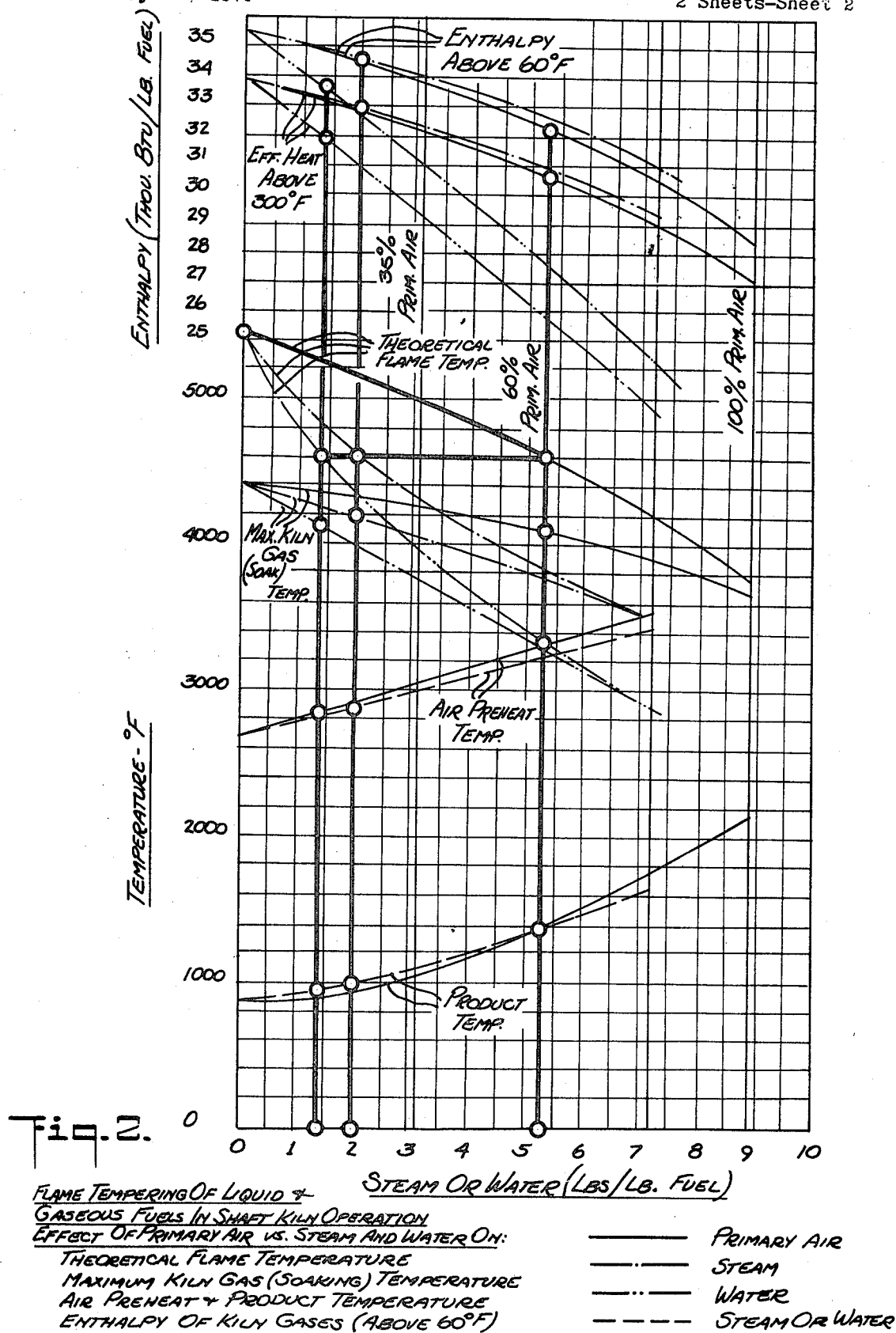

ABSTRACT OF THE DISCLOSURE

This disclosure relates to the production of refractory material in a vertical shaft forced draft kiln wherein a controlled quantity of water or steam is introduced with the combustion fuel into the burning zone of the kiln while passing said refractory material from the upper to the lower end thereof through successive preheating, burning and cooling zones, thereby effecting a close control over the flame temperature.

---

This invention relates to the production of refractory material, and more particularly to a method of dead-burning refractory materials. It is particularly adapted, among other possible applications, for use in producing periclase or dead-burned magnesia (MgO), alumina, dolomite, bauxite and mullite, for example.

In the production of refractory materials of particularly high density a vertical shaft forced draft kiln is employed which consists basically of a refractory lined vertical shaft of varying cross-section and height through which broken or briquetted material to be dead-burned is passed. The raw material is charged at the top of the shaft kiln, and is passed progressively downwardly through successive preheating, burning and cooling zones. Kiln gases are made to flow upwardly from the bottom of the kiln to both cool the kiln charge after it passes the burning zone and to preheat the charge prior to its entry into the burning zone.

In a modern forced draft kiln, burning is effected by means of the combustion of gas or liquid fuels by injecting the fuel into the mid-section of the kiln through burners positioned around the periphery thereof. Each burner passes through the kiln shell and through the kiln refractory walls and fires directly into the kiln charge where the fuel is burned within the interstitial spaces or voids present between discrete particles of pelletized, briquetted, or broken solid material. Heretofore, the fuel was injected with varying proportions of primary or burner air, generally at a temperature of about 120° to about 180° F. corresponding to the adiabatic compression of the combustion air. The balance of the combustion air required for complete combustion of the fuel was introduced through the bottom of the kiln. The bottom air was forced to flow upwardly and countercurrently to the downcoming kiln charge, thereby cooling the charge from an initial hot zone temperature down to a product discharge temperature. The heat lost by the charge was picked up by the cooling air, thereby preheating this air. That is, the fuel was burned with a mixture of "cold" primary air and "pre-heated" bottom cooling air.

The total volume of gases that can be forced upwardly through the kiln charge is limited by the fact that an excessive volume will require unreasonably high pressure at the kiln bottom to force it through, and will result in "fluidization," "lifting," or "spouting" of the kiln charge. Because of this, as the volume of (primary) burner air is increased, the volume of (secondary) bottom air that can be used is proportionately decreased.

Periclase is normally produced by taking previously calcined and powdered MgO and mechanically compressing it into briquettes having a bulk density of between 1.8 to about 2.4. The MgO briquettes are then dead-burned in a shaft kiln to temperatures of the order of about 3600° to about 4000° F., which results in sintering and densification of the original briquettes to a final density of between about 3.25 to about 3.40. This material is subsequently crushed, sized, blended and molded into bricks, which upon a final firing form an excellent grade of refractory material for use with the basic oxygen furnace in the manufacture of steel, for example. The ideal operating conditions for dead-burning of periclase requires kiln temperatures in excess of about 3600° F., with no localized temperature in excess of the softening point of the charge, which is about 4500° F. for MgO and depends to a considerable extent on impurities. The present invention is directed to this dead-burning process.

Heretofore, difficulty was experienced, particularly with lower temperature refractory materials, such as alumina ($Al_2O_3$), mullite as well as periclase, because of the narrow temperature gap between the temperature required for densification and sintering and the relatively low melting or softening point of the material, due to inadequate flame temperature control. According to the usual methods heretofore practiced, combustion of fuel in the kiln charge is effected partly with primary air introduced with the fuel and partly with the bottom air which had been preheated to temperatures of between about 2600° and about 3200° F. This high air preheat temperature resulted in flame temperatures well in excess of the softening or melting point of the charge, and it often led to localized overheating, thereby forming clinkers from moderate to massive size which were inimical to smooth and uninterrupted kiln operation. Occasionally these accretions became large enough to result in a charge "hangup," thereby causing interruption of the normal operation of the kiln. To attempt to overcome the tendency of localized overheating, the present conventional practice is to add varying amounts of cold primary air with the kiln fuel to depress the flame temperature. The tempering effect of the added cold air was limited and, accordingly, the prior art processes experienced substantial difficulties.

In view of the foregoing, this invention contemplates the provision of a new and improved process of dead-burning refractory materials in a vertical shaft kiln characterized by the steps of feeding material to be dead-burned into the upper end of the kiln and removing the dead-burned material from the lower end of the kiln while causing air to flow upwardly from the lower end thereof, and while introducing a controlled quantity of water or steam with combustion fuel into the shaft kiln to form a flame zone at a controlled temperature. According to the invention, the fuel burned with the admixed water or steam has a lower flame temperature and the added steam depresses the flame temperature without sacrificing the heat content of the kiln gases or "soaking"

temperature because of the high specific heat of the water vapor. In the case of tempering with water, the losses incurred as latent heat of vaporization of water are more than regained by the ability to use more air at the bottom of the kiln for cooling, resulting in improved overall heat recovery in the form of a larger air mass of preheat temperature.

Thus, the use of steam or water depresses the temperature level of the flame and narrows the gap between the flame temperature and the "soaking" temperature, which provides for safer dead-burning of refractory materials, especially those having a low melting point, yet requiring soaking temperatures approaching their melting point, or that temperature level where they become sticky.

By contrast, the use of more primary air with the fuel, as heretofore, in lieu of steam or water limits the use of bottom cooling air and results in low thermal efficiency and an unmanageable high flame and product temperature.

Other objects and advantages of the invention will be set forth in part hereinafter and in part will be apparent herefrom or may be learned by practice with the invention, the same being realized and obtained by means of the instrumentalities and combinations pointed out in applicant's claims.

The invention consists in novel parts, construction or arrangements of methods and improvements herein shown and described.

The accompanying drawing referred to and constituting a part hereof illustrates embodiments of the invention and together with the description serves to explain the principles of the invention.

FIG. 1 is a schematic arrangement of a portion of a typical vertical shaft kiln showing the soaking, burning and cooling zones provided with the present invention, while FIG. 2 is a graph showing the relationship of steam and water on the combustion of fuel oil, versus the effect of cold primary air.

Referring in particular to FIG. 1, there is illustrated a kiln shell 10 encompassing a refractory wall 12 defining a vertical kiln shaft 14. The kiln shaft includes an upper preheating zone 16, a medial hot zone which includes a soaking zone 18 and a flame zone 20, and a lower cooling zone 22.

Heating of the charge of material to be processed is effected by means of a burner arrangement including a fuel supply line 24, which delivers fuel to an air-gas mixing chamber 26. Any suitable source of fuel may be employed, such as liquid fuels or gaseous fuels, for example, but liquid fuels are injected directly to the burners, preferably as an emulsion. In the case of gaseous fuels a control valve 28 is mounted in the line 24 for control purposes. Water or steam is supplied from a supply line 30 and passed through a control valve 32 on its way to the mixing chamber 26. The mixture of fuel and water passes from the mixing chamber 26 to an annular header 34 surrounding the kiln shell 10. A plurality of individual nozzles or burners 36 lead from the header and extend through the kiln shell and refractory walls for firing directly into the kiln charge or burden where the fuel is burned within the interstitial spaces or voids present between discrete particles of pelletized, briquetted or broken solids. The burners may be deployed in a series of vertically offset banks, if desired.

Air 38 is introduced at the bottom of the kiln and is forced to flow upwardly, countercurrently with respect to the downcoming kiln charge or refractory material being processed. This air is used in the combustion process which takes effect in the burning zone and, in addition, it serves to cool the kiln charge passing downwardly through the kiln. In this manner, the kiln charge is cooled from an initial hot zone temperature of the order of about 3600° to about 4000° F., down to a product discharge temperature which may range from the order of about 400° to about 1200° F. That is, the heat lost by the charge is picked up by the upwardly flowing cooling air which is thereby preheated to a temperature of the order of about 2600° to about 3200° F., by the time it reaches the burning zone.

Until the present invention, substantial quantities of primary air were added to the fuel in the mixing chamber 26 for cooling purposes. In view of the fact that a substantially fixed quantity of air is required for complete combustion of the fuel and there is a limit to the total mass of gases that can be forced up the kiln, the quantity of air 38 added at the bottom of the column is therefore limited. Since the quantity of air added at the bottom of the kiln is preheated before reaching the burning zone, thereby removing heat from the final product which would otherwise be wasted, it is desirable to utilize as much of this air as possible. According to the present invention a substantial portion, if not all, of the air is added at the bottom of the kiln, and the steam or water added to the mixing chamber or directly into individual burners in the case of liquid fuels serves to effect the necessary cooling of the flame.

In operation, a charge of pelletized, briquetted or broken solids of refractory material 40, such as periclase, alumina, dolomite, bauxite, and mullite, for example, is fed into the upper end of the kiln shaft and passed downwardly through the preheating zone 16 to the soaking zone 18 and flame zone 20, wherein the material is fired or dead-burned, thereby resulting in a phase change with sintering and densification of the original briquettes to a final increased density. If the refractory material being processed is periclase, the kiln temperature must be in excess of 3600° F., but with no localized temperature in excess of the softening point of the charge which is of the order of about 4500° F. If the refractory material is alumina, the kiln temperature must be in excess of about 3100° F. to 3200° F., with no localized temperature in excess of about 3630 to 3680° F. If the refractory material is mullite, the kiln temperature must be in excess of the order of about 3300° F., but with no localized temperature in excess of the order of about 3500° F.

It should be appreciated that, heretofore, utilizing partly cold primary air and partly air which has been preheated to temperatures of about 2600 to about 3000° F., flame temperatures substantially in excess of the softening or melting point of the charge were encountered and the resulting localized overheating formed objectionable clinkers in the charge.

By contrast in the present invention, flame tempering is effected by means of the water or steam added to the fuel. The flow of water or steam is controlled by the valve means 32 in order to control the flame temperature to the desired level in each case, and to depress the kiln gas temperature or "soaking" temperature by storing comparable amounts of thermal energy at a lower temperature level by means of the water vapor, which has a specific heat twice as high as that of air or combustion products. Thus, the fuel burned with admixed water or steam has a lower flame temperature than when burned with air and the added steam depresses the "soaking" temperature because of the higher specific heat of the water vapor. Losses incurred as latent heat of vaporization when water is used are more than regained by the increased rate of upwardly flowing cooling air at preheat temperature. The selection of the use of steam or water depends upon the material being fired and its specific requirements as to maximum allowable flame temperature and minimum "soaking" temperature requirements.

In one form of the invention the addition of water to the fuel is accomplished by the formation of an oil-in-water emulsion which is particularly adapted for cold handling of heavy oils such as bunker C fuel, for example.

Table I illustrates the effect of steam and water on the combustion of fuel oil, versus the effect of cold primary air.

TABLE I.—EFFECT OF STEAM AND WATER ON THE COMBUSTION OF FUEL OIL

|  | Primary air | | | | Steam | | | | Water | | | |
|---|---|---|---|---|---|---|---|---|---|---|---|---|
| Burner additive: | | | | | | | | | | | | |
| Amount (lbs. per lb. of fuel) | 0 | 35% | 60% | 100% | 1 | 2 | 4 | 7.2 | 1 | 2 | 4 | 7.2 |
| Burner air (lbs. per lb. of fuel) | 0 | 5.0 | 8.6 | 14.3 | 0 | 0 | 0 | 0 | 0 | 0 | 0 | 0 |
| Cooling air (lbs. per lb. of fuel) | 25.9 | 20.9 | 17.3 | 11.6 | 24.3 | 22.7 | 19.5 | 14.3 | 24.3 | 22.7 | 19.5 | 14.3 |
| Total air (lbs. per lb. of fuel) | 25.9 | 25.9 | 25.9 | 25.9 | 24.3 | 22.7 | 19.5 | 14.3 | 24.3 | 22.7 | 19.5 | 14.3 |
| Air preheat temp. (° F.) | 2,700 | 3,000 | 3,320 | 3,560 | 2,820 | 2,920 | 3,150 | 3,450 | 2,820 | 2,920 | 3,150 | 3,450 |
| Product temp. (° F.) | 830 | 1,000 | 1,340 | 2,130 | 910 | 980 | 1,180 | 1,640 | 910 | 980 | 1,180 | 1,640 |
| Theoretical flame temp. (° F.) | 5,400 | 4,980 | 4,615 | 3,780 | 4,960 | 4,580 | 4,080 | 3,510 | 4,810 | 4,340 | 3,650 | 2,890 |
| Max. soak temp. (° F.) | 4,410 | 4,230 | 4,120 | 3,690 | 4,280 | 4,180 | 4,040 | 3,510 | 4,200 | 3,990 | 3,540 | 2,890 |
| Temperature difference | 990 | 750 | 495 | 90 | 680 | 400 | 40 | 0 | 610 | 350 | 110 | 0 |
| Enthalpy (b.t.u. per lb. of fuel) | 35,450 | 33,700 | 32,630 | 28,600 | 35,020 | 34,640 | 33,840 | 31,070 | 34,080 | 32,760 | 29,650 | 24,270 |
| Effective heat above 300° F | 33,920 | 32,170 | 30,980 | 27,100 | 33,380 | 32,980 | 32,140 | 29,300 | 32,440 | 31,100 | 27,950 | 22,500 |

NOTE.—1. Burner and cooling air assumed to be at 100° F.; 2. Water additive and fuel assumed to be at 160° F.; 3. Steam is saturated at 25 p.s.i.a.

The data shown in Table I shows a significantly depressed theoretical flame temperature when utilizing steam or water as compared with the combustion based on the use of varying quantities of primary air introduced with the fuel in the manner of the prior art processes. More specifically, a flame temperature of 5400° F., calculated for combustion with no primary air is depressed to 4980° F., by the use of 35% of stoichiometric air requirements as primary air, while the same temperature can be achieved by the use of 0.9 pound of steam or 0.6 pound of water. Similarly, 60% primary air yields a flame temperature of 4615° F., which can be matched by the use of 2.0 pounds of steam or 1.4 pounds of water per pound of fuel. Similarly, the flame temperature when burning with 100% theoretical air is 3780° F., which may be achieved by the use of 5.7 pounds of steam or 3.8 pounds of water per pound of fuel.

More signficantly, the enthalpy or sensible heat content of the kiln gases at about 60° F., is greater when either steam or water are used than with 35% primary air. It will be appreciated that the effective heat above 300° F., represents sensible heat available in the kiln gases if cooled to 300° F. before discharging them to the atmosphere. It is noted that the effective heat is highest when tempering steam is used, next highest when water is used and the lowest when cold primary air is used all in the quantities required to yield comparable flame temperatures. This is an additional advantage of the use of steam or water in lieu of primary air as employed by the prior art processes. To better follow the above relationships, graph, FIG. 2, has been plotted to show the data of Table 1. In this graph we show heavy lines to trace a comparison of data using 60% (cold) primary air, versus steam and water in proportions required to achieve an identical flame temperature, in this case 4615° F. By extending vertical lines above and below the flame temperature line, we are able to read the appropriate data lines corresponding to enthalpy above 60° F. and effective heat in kiln gases; soaking temperature, air preheat temperature and product temperature, plus the amount of steam or water required to achieve the flame temperature required.

In order to illustrate the invention more fully, the method of dead-burning alumina was investigated. Alumina melts at between about 3630° to 3680° F., and requires a temperature of about 3100° to 3200° F., for sintering. Using 100% primary air according to prior art methods, the theoretical flame temperature is about 3750° F. Considering that the actual flame temperature will be lower than the theoretical flame temperature, it may be assumed that 100% air can be safely used without melting the alumina charge in the vicinity of the flame. The kiln gas or "soaking" temperature is about 3660° F., and, therefore, well in excess of that required for sintering. However, the enthalpy of the kiln gases is only 28,400 B.t.u.'s per pound of fuel used and the product temperature is of the order of about 2200° F., because of insufficient air available for cooling.

If, according to the present invention, steam is employed, and if 5.7 pounds of steam per pound of fuel is used, the flame temperature will be about 3750° F., with a soaking temperature of about 3720° F., and the enthalpy will be about 32,500 B.t.u.'s per pound of fuel, and the final product temperature will be about 1400° F.

If water is employed according to the invention and if 3.8 pounds of water per pound of fuel is used, the theoretical flame temperature will be about 3760° F., and the soaking temperature will be about 3600° F., with an enthalpy of 30,000 B.t.u.'s per pound of fuel, and the final product temperature will be about 1400° F.

It will be appreciated from the foregoing that the advantages of steam and water are substantial because with a comparable flame temperature, significantly higher kiln gas or "soaking" temperatures are achieved and, in addition, a much lower product temperature results due to the fact that more air can be introduced at the bottom of the kiln for cooling.

The presently preferred embodiments of the invention have been described for purposes of explanation. It should be understood that modifications may be made therein as will appear evident to those skilled in the art to which the invention pertains. It is, therefore, intended to encompass all such changes as fall within the true spirit of the invention.

What is claimed is:

1. A method of dead-burning refractory material in a vertical shaft kiln comprising the steps of: feeding material to be dead-burned into the upper end of the kiln shaft, passing said material downwardly in said kiln shaft from the upper to the lower end thereof through successive soaking, flame and lower cooling zones, removing dead-burned material from the lower end of said kiln shaft, while causing, an air flow upwardly into the lower end of said kiln shaft, and while introducing a controlled quantity of cooling $H_2O$ with combustion fuel in fluid form, to said kiln shaft adjacent the middle thereof to intermix with and flow upwardly in a counter-current flow pattern with respect to the movement of said material to be dead-burned to form said flame zone at an even controlled temperature to effect the dead-burning of said material in the kiln shaft, thereby eliminating substantial localized overheating throughout said soaking and flame zones.

2. A method of dead-burning refractory material in a vertical shaft kiln according to claim 1 wherein said controlled quantity of $H_2O$ is in a liquid state.

3. A method of dead-burning refractory material in a vertical shaft kiln according to claim 1 wherein said controlled quantity of $H_2O$ is in a vapor state.

4. A method of dead-burning refractory material in a vertical shaft kiln according to claim 1 wherein said material is caused to travel through said kiln shaft substantially continuously.

5. A method of dead-burning refractory material in a vertcial shaft kiln according ot claim 1 wherein said refractory material is selected from the class consisting of periclase, alumina, dolomite, bauxite and mullite.

6. A method according to claim 1, wherein said refractory material is periclase and the dead-burning temperature is maintained in a temperature range of between about 3600° F. and about 4000° F. by controlling the introduction of said cooling H₂O.

7. A method according to claim 1, wherein said refractory material is alumina and the dead-burning temperature is maintained in a temperature range between about 3100° F. and below about 3600° F., the melting point of alumina, by controlling the introduction of said cooling H₂O.

8. A method according to claim 1, wherein said refractory material is mullite and the dead-burning temperature is maintained in a temperature range between about 3000° F. and below about 3500° F., the melting point of mullite, by controlling the introduction of said cooling H₂O.

9. A method according to claim 1, wherein said cooling H₂O and said combustion fuel are premixed in a separate mixing chamber and thence the mixture is fed into a medial portion of said kiln shaft at a plurality of spaced locations around the periphery thereof.

References Cited
UNITED STATES PATENTS

| | | | |
|---|---|---|---|
| 3,202,405 | 8/1965 | Stanley | 263—29 |
| 1,912,621 | 6/1933 | Clark | 263—29 X |
| 1,805,151 | 5/1931 | Reed | 263—29 |
| 1,798,802 | 3/1931 | Niles | 263—29 |
| 2,464,304 | 3/1949 | Gottlieb | 263—29 |

JOHN J. CAMBY, Primary Examiner

U.S. Cl. X.R.

432—17, 79